US006744369B2

(12) United States Patent
Sata

(10) Patent No.: US 6,744,369 B2
(45) Date of Patent: Jun. 1, 2004

(54) GATE ENTRY SYSTEM USING SHORT RANGE RADIO COMMUNICATIONS WITH USER TERMINAL DEVICES

(75) Inventor: Yutaka Sata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/108,466

(22) Filed: Mar. 29, 2002

(65) Prior Publication Data

US 2002/0145505 A1 Oct. 10, 2002

(30) Foreign Application Priority Data

Mar. 30, 2001 (JP) .................................... P2001-102420

(51) Int. Cl.[7] ........................ G05B 19/00; G05B 23/00; G06K 5/00; G07B 15/02; G06F 17/60

(52) U.S. Cl. ...................... 340/573.1; 340/5.2; 340/5.7; 340/5.72; 340/572.1; 235/380; 235/382; 235/384; 705/13

(58) Field of Search ......................... 340/5.2, 5.1, 5.61, 340/540, 539.1, 573.1, 539.11, 928, 5.3, 5.42, 5.7, 5.72, 572.1; 235/380, 384, 382; 705/13

(56) References Cited

U.S. PATENT DOCUMENTS 5,382,781 A * 1/1995 Inoue ........................ 235/384
5,397,883 A * 3/1995 Miyashita .................. 235/382
5,414,249 A * 5/1995 Matsumoto ................. 235/384
5,831,547 A * 11/1998 Ohtsuki et al. .......... 340/10.41
5,877,484 A * 3/1999 Hirose ........................ 235/382
6,070,146 A * 5/2000 Mimata ....................... 705/13
6,450,404 B1 * 9/2002 Imazuka ..................... 235/381

* cited by examiner

*Primary Examiner*—Brent A. Swarthout
*Assistant Examiner*—Lam Pham
(74) *Attorney, Agent, or Firm*—Oblon, Spivak, McClelland, Maier & Neustadt, P.C.

(57) ABSTRACT

A gate entry system for regulating passages of passengers is formed by a wall unit for forming a passageway that is extended along a passing direction of the passengers, a gate unit provided at an exit side of the passageway, which is capable of being opened or closed to regulate the passages of the passengers, human sensors for sensing the passengers in the passageway, a radio communication unit for detecting a number of passengers entering into the passageway according to outputs of the human sensors, and carrying out transmission/reception of data with respect to at least one terminal device of one passenger, and a control unit for controlling opening or closing of the gate unit according to the data received by the radio communication unit.

16 Claims, 10 Drawing Sheets

TICKET GATE DEVICE

TICKET GATE DEVICE

GATE ENTRY SYSTEM USING SHORT RANGE RADIO COMMUNICATIONS WITH USER TERMINAL DEVICES

BACKGROUND OF THE INVENTION

1. Field of the Invention

The present invention relates to a gate entry system for regulating passages of passengers.

2. Description of the Related Art

As a conventional gate entry system for regulating passages of passengers, there is an automatic checking and collecting machine used at a railway station, for example. In order to pass the automatic checking and collecting machine, the user enters a commutation pass of the user into the automatic checking and collecting machine, and if the commutation pass is recognized as valid, the user can pass the automatic checking and collecting machine. For this reason, by the use of the automatic checking and collecting machine, it has been possible to comprehend users of the station accurately, while limiting passages of users quickly.

However, in the conventional automatic checking and collecting machine, a ticket or pass conveyor section and a ticket or pass examination section have been expensive so that the price of the automatic checking and collecting machine itself has been very high. Also, the conveyor section requires the fine-tuning and the maintenance cost due to its severe operating environment. In addition, when the area for placing the automatic checking and collecting machine is limited, the automatic checking and collecting machine itself is so large that there has been a drawback that it is difficult to place many automatic checking and collecting machines. Also, there has been an inconvenience that tickets usable for the automatic checking and collecting machine can be purchased only at limited places such as the railway station.

As a technique for overcoming such drawbacks, there is a contactless radio IC card (ISO14443). The contactless radio IC card is formed by a short range radio communication unit of the electromagnetic induction type, a tamper-resistant memory, and a process unit MPU, and the automatic checking and collecting machine can detect and check the card in a short period of several hundred msec., when the card is brought within a distance of approximately 10 cm from a reader/writer implemented in the automatic checking and collecting machine. The user can pass the automatic checking and collecting machine by simply holding the commutation pass card close to the reader/writer, so that there is no need for the conveyor section.

On the other hand, the radio technology for use in the portable telephone and the like has been developed recently, and in particular the short range radio technology called Bluetooth is currently attracting much attentions. The Bluetooth is designed for the consumer use and the mobile use so that it has features of a low power consumption and a low cost, and it is expected to be installed on many portable devices in near future. The Bluetooth can cooperate not only with the personally owned devices but also with any peripheral electronic devices, so that it has a potential for providing the powerful network infrastructure for realizing various services.

Compared with the contactless radio IC card, the Bluetooth has drawbacks in its long processing time and its weak security. However, if it is possible to develop an automatic checking and collecting machine in which the user can pass by utilizing a portable telephone with the Bluetooth installed thereon, there can be an advantage in that it becomes possible for the user to pass the automatic checking and collecting machine by utilizing his own portable telephone without being required to purchase a ticket or the like. Also, by utilizing the Bluetooth for the other purposes, it can be expected that a highly attractive commercial market will be created.

However, in the case of applying the Bluetooth to the automatic checking and collecting machine, there is a possibility for erroneously establishing the communication connection with the Bluetooth of the terminal device owned by a person other than the passenger who is currently trying to pass the automatic checking and collecting machine (such as a subsequent passenger, for example) and checking that other person's ticket rather than the passenger's ticket.

Also, when a plurality of passengers enter into the automatic checking and collecting machine consecutively, the communication data of the plurality of passengers will come into the radio wave reachable range of the Bluetooth on the automatic checking and collecting machine, such that it becomes impossible for the automatic checking and collecting machine side to check tickets in the correct order by which the passengers entered the automatic checking and collecting machine.

BRIEF SUMMARY OF THE INVENTION

It is therefore an object of the present invention to provide a gate entry system capable of carrying out the processing of the passengers properly at the automatic checking and collecting machine side, even when the Bluetooth is applied to the automatic checking and collecting machine, for example.

According to one aspect of the present invention there is provided a gate entry system for regulating passages of passengers, comprising: a wall unit configured to form a passageway that is extended along a passing direction of the passengers; a gate unit provided at an exit side of the passageway, which is capable of being opened or closed to regulate the passages of the passengers; human sensors configured to sense the passengers in the passageway; a radio communication unit configured to detect a number of passengers entering into the passageway according to outputs of the human sensors, and carry out transmission/reception of data with respect to at least one terminal device of one passenger; and a control unit configured to control opening or closing of the gate unit according to the data received by the radio communication unit.

Other features and advantages of the present invention will become apparent from the following description taken in conjunction with the accompanying drawings.

DETAILED DESCRIPTION OF THE INVENTION

Referring now to FIG. 1 to FIG. 10, one embodiment of a gate entry system according to the present invention will be described in detail.

(Configuration of the Gate Entry System)

Figure 1:
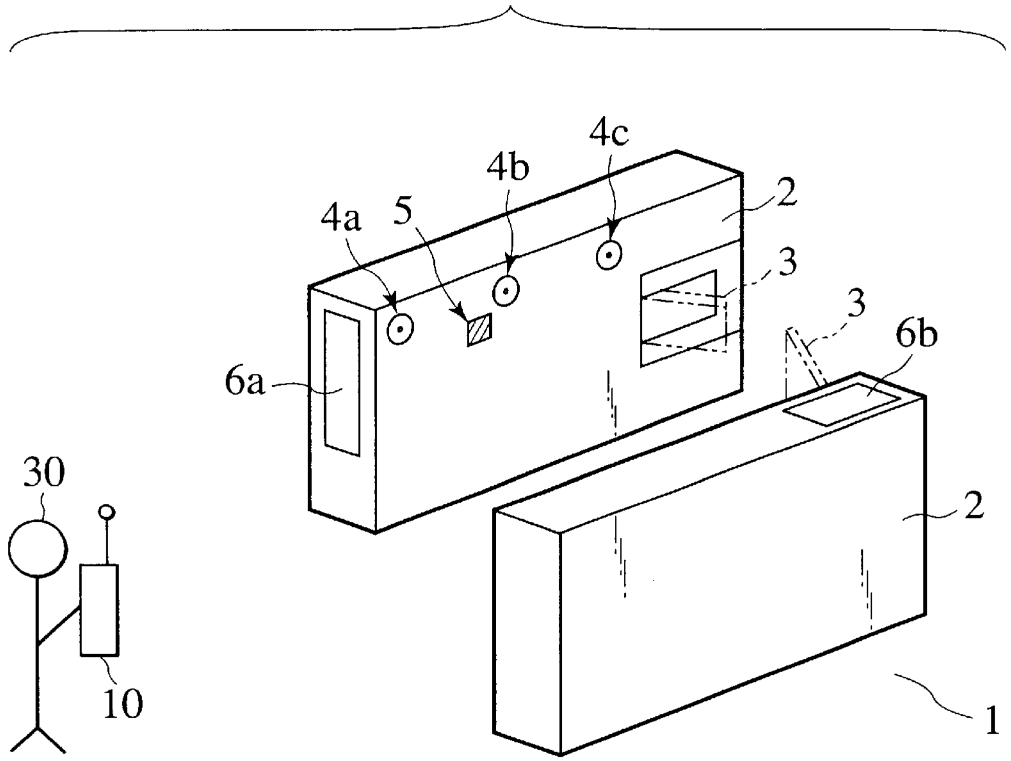
FIG. 1 is a diagram showing a perspective view of a gate entry system according to one embodiment of the present invention.

FIG. 1 shows a schematic configuration of the gate entry system according to this embodiment.

As shown in FIG. 1, the gate entry system of this embodiment has a ticket gate device 1 for regulating a passage of a passenger 30, and a terminal device 10 carried by the passenger 30. The ticket gate device 1 comprises: a wall unit 2 that is extended in a passing direction of the passenger and forming a passageway; a gate unit 3 provided at an exit side of the passageway which can be opened or closed for regulating the passage of the passenger; human sensors 4*a* to 4*c* for sensing the passenger in the passageway; a radio communication unit 5 for carrying out data transmission/reception with respect to the terminal device 10 carried by the passenger in the passageway by cooperating with the human sensors 4*a* to 4*c*; and display units 6*a* and 6*b* for displaying a state of progress of the processing by a control unit (not shown) to be described below.

Figure 2:
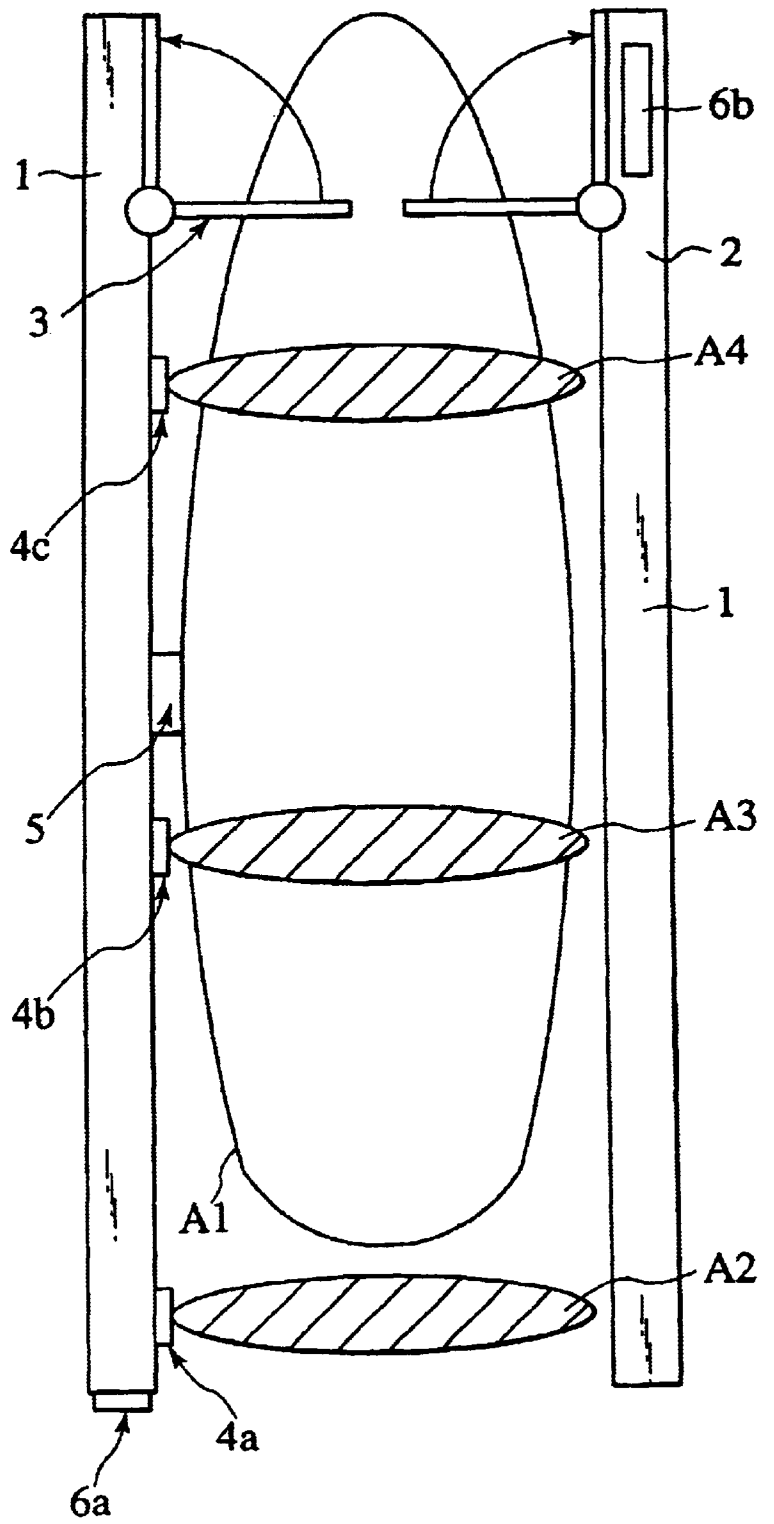
FIG. 2 is a diagram showing a plan view of a ticket gate device of the gate entry system according to one embodiment of the present invention.

Also, FIG. 2 shows a plan view of the ticket gate device 1 of FIG. 1 seen from the above. In FIG. 2, the shaded ellipses A2 to A4 indicate detectable ranges of the human sensors 4*a* to 4*c*. Also, an ellipse A1 shown between two portions of the wall unit 1 indicates a communication possible range of the radio communication unit 5. In this embodiment, as shown in FIG. 2, the detectable range A2 of the human sensor 4*a* is arranged at a front side of the communication possible range A1 of the radio communication unit 5 along the passing direction of the passageway.

In this embodiment, the wall unit 2 forms the passageway extended along the passing direction of the passenger 30, and constitutes the automatic checking and collecting machine body to be placed in the railway station, for example.

Figure 3A:
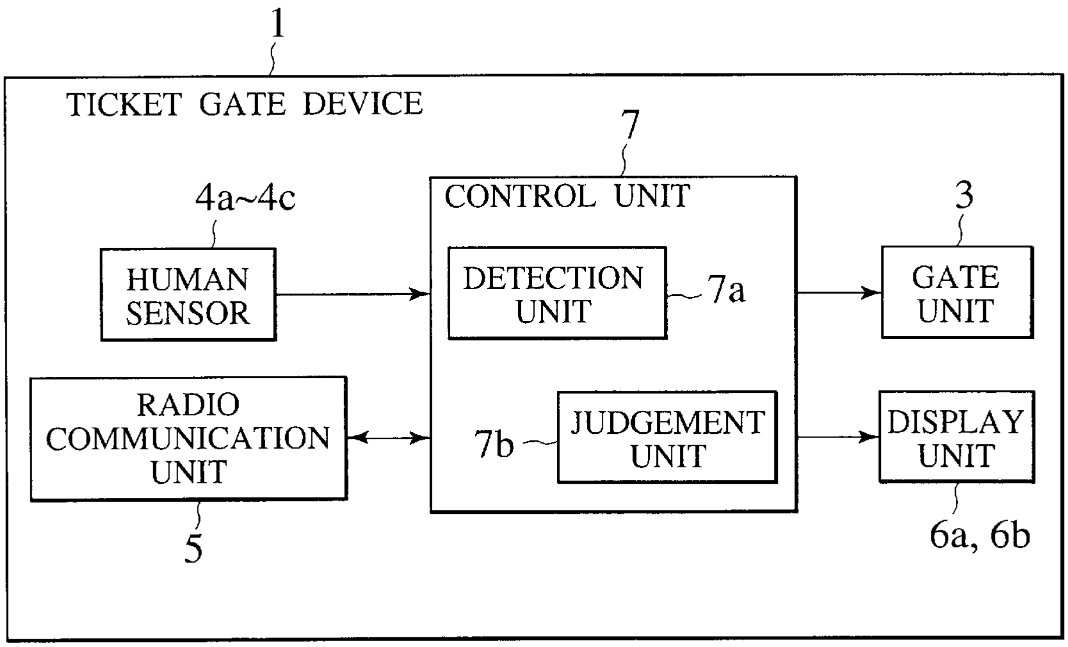
FIG. 3A is a block diagram showing an internal configuration of a ticket gate device of the gate entry system according to one embodiment of the present invention.

Also, as shown in FIG. 3A, the ticket gate device 1 has an internal configuration that includes the control unit 7.

The human sensors 4*a* to 4*c* for sensing the passenger in the passageway can be provided in forms of light sensors, weight sensors, etc., for example. Note that the human sensor 4*a* is arranged in a vicinity of an entrance of the ticket gate device 1, the human sensor 4*b* is arranged in a vicinity of a middle of the ticket gate device 1, and the human sensor 4*c* is arranged in a vicinity of an exit of the ticket gate device 1. The sensor signals of these human sensors 4*a* to 4*c* are outputted to a detection unit 7*a* inside the control unit 7.

The control unit 7 controls the gate unit 3 to open or close according to the received data. In this embodiment, the control unit 7 has the detection unit 7*a* and a judgement unit 7*b*, as well as an internal memory (not shown) for storing the control program, etc.

The detection unit 7*a* judges whether the human sensors 4*a* to 4*c* have sensed the passenger 30 or not. More specifically, when the sensor signal from the human sensor 4*a* is entered, the detection unit 7*a* outputs a reception signal for receiving data from the terminal device 10 to the radio communication unit 5. Also, when the sensor signal from the human sensor 4*a* and the human sensor 4*b* are entered, the detection unit 7*a* judges that more than one passenger 30 have entered into the ticket gate device 1, and outputs a subsequent entry refusal command signal for refusing an entry of the subsequent passenger 30 to the display unit 6*a* (6*b*).

The judgement unit 7*b* judges the validity of the data received by the radio communication unit 5. More specifically, when the data signal is received by the radio communication unit 5, the judgement unit 7*b* judges whether that data is valid or not in terms of a valid period, a valid region, etc., of the information data.

Then, when the detection signal indicating the detection of the sensor signal of the human sensor 4*c* fixed to near the exit is transmitted from the detection unit 7*a* and it is judged that the data of the passenger is valid, the judgement unit 7*b* outputs a passing signal for passing the passenger 30 to the gate unit 3. On the other hand, when it is judged that the data of the passenger is invalid, regardless of the sensor signal from the human sensor 4*c*, the judgement unit 7*b* outputs a passing refusal signal for blocking the passenger 30 to the gate unit 3.

Also, the control unit 7 can close the gate unit 3 when at least one of the human sensors 4*b* and 4*c* having the detectable ranges A3 and A4 that overlaps with the communication possible range A1 of the radio communication unit 5 detects the passenger before the data transmission/reception is completed.

The gate unit 3 is provided at the exit side of the passageway and opened or closed to control the passage of the passenger, using a servo controller driven by a servo motor, for example. More specifically, the gate unit 3 opens the gate so as to pass the passenger 30 when the passing signal for passing the passenger 30 in the ticket gate device 1 is entered from the judgement unit 7*b*.

On the other hand, the gate unit 3 closes the gate so as not to pass the passenger 30 when the passing refusal signal for blocking the passage of the passenger 30 in the ticket gate device 1 is entered from the judgement unit 7*b*.

The display unit 6*a* (6*b*) displays a state of the process by the control unit 7, and can be provided in a form of a LED display, a liquid crystal display, etc., for example. More specifically, the display unit 6*a* (6*b*) can change the screen display content according to the signals entered from the detection unit 7*a* and the judgement unit 7*b*.

For example, when the detection unit 7*a* judges that more than one person has entered into the ticket gate device 1, the subsequent entry refusal command signal for blocking the subsequent passenger 30 in the ticket gate device 1 is outputted to the display unit 6*a* (6*b*). When the subsequent entry refusal command signal is entered, the display unit 6*a* (6*b*) displays a message for blocking the entry of the subsequent passenger (such as "do not enter" or "passing disapproved", for example).

Namely, when the judgement unit 7*b* judged that the data is valid, the judgement unit 7*b* outputs the passing signal for passing the passenger 30 in the ticket gate device 1 to the display unit 6*b*. On the other hand, when the judgement unit 7*b* judges that the data is invalid, the judgement unit 7*b* outputs the passing refusal signal for not passing the passenger 30 in the ticket gate device 1 to the display unit 6*b*.

When the passing signal is transmitted from the judgement unit 7*b*, the display unit 6*b* displays a message indicating the validness (such as "valid"), whereas when the passing refusal signal is transmitted1 from the judgement unit 7*b*, the display unit 6*b* displays a message indicating the invalidness (such as "invalid", for example).

Also, when the processing of the data is still in progress, the judgement unit 7*b* outputs a processing in progress signal indicating that the processing is still in progress (a signal commanding the display of "processing", for example) to the display unit 6*a* (6*b*). When the processing in progress signal is transmitted from the judgement unit 7*b*, the display unit 6*a* displays a message for refusing the entry of the subsequent passenger 30 (such as "no further entry permitted", for example). Also, the display unit 6*b* displays a message indicating that the processing is in progress (such as "processing", for example). The display unit 6*a* (6*b*) can also display the state of progress of the processing by utilizing an indicator or the like.

Also, the display unit 6*a* (6*b*) has an entry regulation function for permitting an entry into the communication possible range A1 of the radio communication unit 5 to only one subsequent passenger while in the state where the connection with the terminal device 10 of one passenger is already established.

The radio communication unit 5 carries out the data transmission/reception to/from the terminal device 10 carried by the passenger 30 in the passageway, in cooperation with the human sensor 4*a*, and can be provided in a form of IrDA, Bluetooth, etc., for example. In particular, in this embodiment, the radio communication unit 5 carries out the establishing of the connection (communication connection) for the data transmission/reception to/from at least one terminal device 10 carried by one passenger, by detecting the number of the passengers entering into the passageway according to the outputs of the human sensors 4*a* to 4*c*.

Here, the data transmitted/received by the radio communication unit 5 may include a commutation pass for the train, a movie ticket, an identifier code specific to the terminal device, etc. Note that IrDA carries out the data communications with infrared rays, and the Bluetooth carries out the data communications with 2.4 GHz radio frequency.

Next, the terminal device 10 in this embodiment will be described.

Figure 3B:
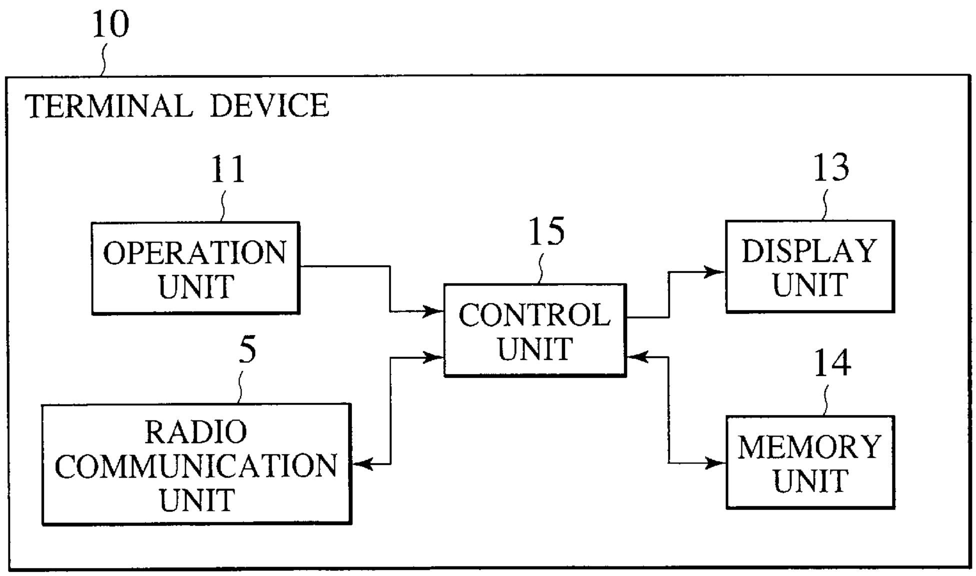
FIG. 3B is a block diagram showing an internal configuration of a terminal device of the gate entry system according to one embodiment of the present invention.

FIG. 3B shows an internal configuration of the terminal device 10 in this embodiment. As shown in FIG. 3B, the terminal device 10 of this embodiment has a radio communication unit 12, a display unit 13 and a control unit 15 which are similar to the radio communication unit 5, the display unit 6*a* (6*b*) and the control unit 7 of the ticket gate device 1 described above, as well as an operation unit 11 and a memory unit 14 that are not existing in the ticket gate device 1. In the following, the difference from the ticket gate device 1 will be mainly described.

The terminal device 10 is a portable device for transmitting data to the ticket gate device 1 through the radio communication unit 12, and can be provided in a form of portable telephone, PDA, etc.

The operation unit 14 enables the input of the information data and the operation of the screen display on the display unit 13, and can be provided in a form of keys on the portable telephone, for example. Note that the operation unit 14 can be a button shaped type, a joystick shaped type, or a speech input type. It is also possible to change the information displayed on a screen by using a touch panel provided on the screen of the display unit 13.

The memory unit 14 stores data of the passengers, and can be provided in a form of FFEROM, for example. It should preferably be a tamper-resistant memory in order to prevent the illegal alteration and the copying. It can possibly be provided in a form of a SD memory card for recording music, or SIM or UIM mounted on the portable telephone such as that of GSM or IMT2000. The data of the passengers to be stored here may include a ticket for the train, a ticket for the movie, an identification code specific to the terminal device, etc.

(Operations of the Gate Entry System)

The operation of the gate entry system in the above described configuration can be realized by the following procedure in this embodiment. Note that the following description is directed to the case of using the Bluetooth as the radio communication unit 5 or the radio communication unit 12.

Figure 4:
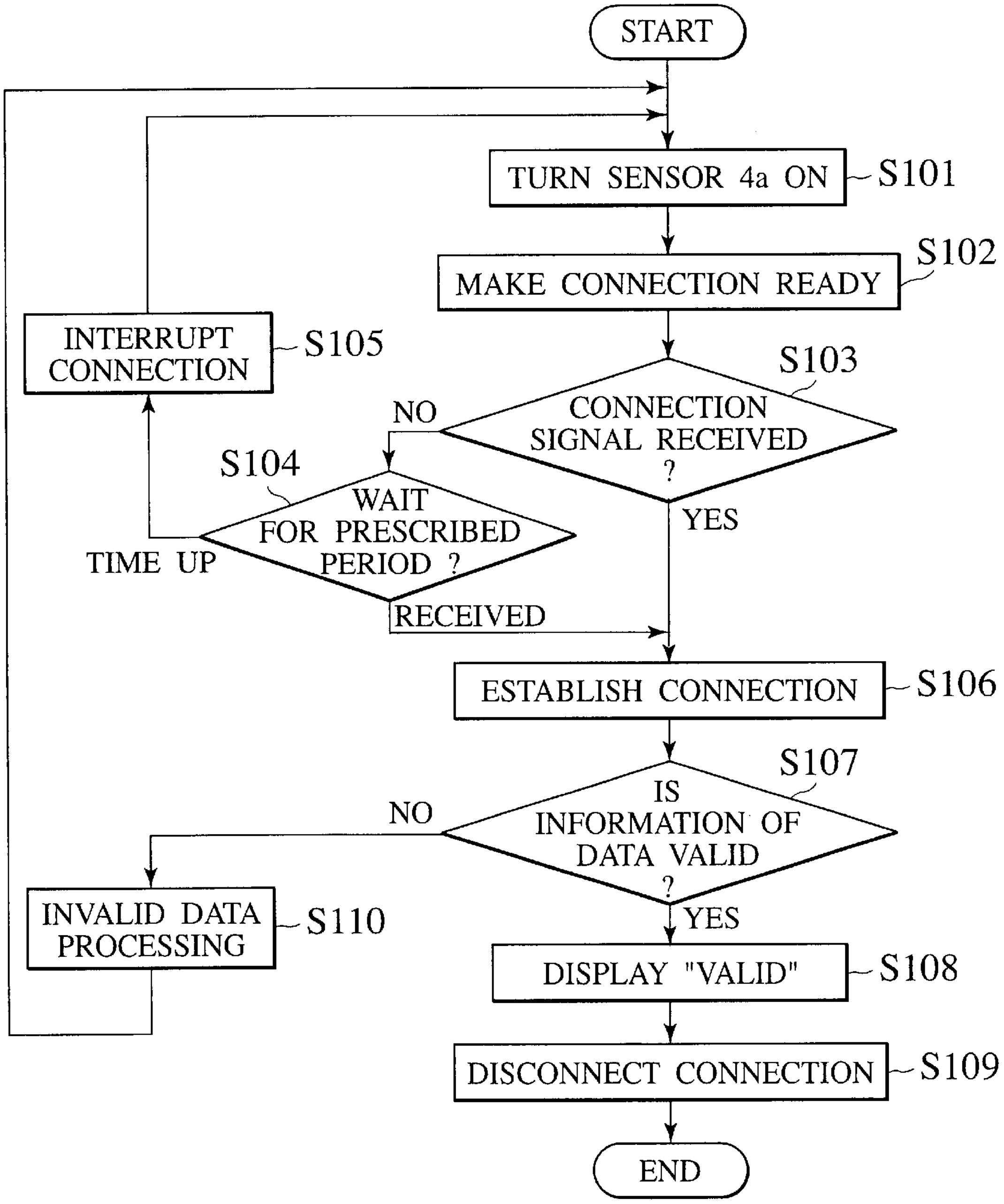
FIG. 4 is a flow chart for an operation of the gate entry system according to one embodiment of the present invention.

(1) The operation in the case where the passenger 30 passes the ticket gate device 1:

FIG. 4 shows a procedure for the operation up to the point where the passenger 30 passes the ticket gate device 1. As shown in FIG. 4, a step for turning the human sensor 4*a* ON is carried out first (step S101). More specifically, when the passenger 30 passes the human sensor 4*a* near the entrance of the ticket gate device 1, the human sensor 4*a* is turned ON. Then, when the human sensor 4*a* is turned ON, the detection signal indicating that the human sensor 4*a* is turned ON is outputted to the detection unit 7*a* of the control unit 7.

Then, a step for setting the radio communication unit 5 of the ticket gate device 1 in the connection ready state is carried out (step S102). More specifically, when the detection signal indicating that the human sensor 4*a* is turned ON is received, the detection unit 7*a* outputs the reception signal for receiving the data from the terminal device 10 to the radio communication unit 5. Then, when the reception signal is transmitted from the detection unit 7*a*, the radio communication unit 5 transmits a connection signal for carrying out the data exchange to the terminal device 10. Here, a message indicating the start of the ticket checking processing is outputted to the display unit 6*b* (which displays "processing" or an indicator for a prescribed time).

Next, the terminal device 10 receives the connection signal from the ticket gate device 1 (step S103), and a step for establishing the communication connection between the ticket gate device 1 and the terminal device 10 is carried out (step S106). On the other hand, when the terminal device 10 does not receive the connection signal from the ticket gate device 1 within a prescribed waiting period, the communication connection is not established between the ticket gate device 1 and the terminal device 10 (steps S104 and S105).

More specifically, if the time-up function (not shown) in the terminal device 10 does not receive the connection signal from the ticket gate device 1 within a prescribed waiting period, the connection with the ticket gate device 1 is automatically interrupted. On the other hand, when the terminal device 10 received the connection signal within the prescribed waiting period, the connection is established.

Next, a step for judging whether the data is valid or not is carried out (step S107). More specifically, after the communication connection is established between the ticket gate device 1 and the terminal device 10, the radio communication unit 5 of the ticket gate device 1 receives the data from the terminal device 10, and outputs that data to the judgement unit 7*b* in the control unit 7. When that data is received, the judgement unit 7*b* judges the validity of the data, such as the date of the ticket, the names of the stations to get on and off, the valid period of the ticket, etc.

Next, a step for displaying "valid" at the display unit 6*b* is carried out (step S108). More specifically, when it is judged that the data is valid as a result of judging the validity of the data at the judgement unit 7*b*, the judgement unit 7*b* outputs the passing signal for passing the passenger 30 in the ticket gate device 1 to the display unit 6*b*. Then, when the passing signal is entered from the judgement unit 7*b*, the display unit 6*b* displays a message indicating the validness such as "valid", for example.

Also, when the processing of the data is still in progress, the judgement unit 7*b* outputs the processing in progress signal indicating that the processing is still in progress to the display unit 6*a* (6*b*). Then, when the processing in progress signal is transmitted from the judgement unit 7*b*, the display unit 6*a* (6*b*) displays a message for refusing the entry of the subsequent passenger 30 (such as "no further entry permitted", for example). Also, the display unit 6*b* displays a message indicating that the processing is still in progress (such as "processing", for example).

On the other hand, when it is judged that the data is invalid by judging the validity of the data at the judgement unit 7*b*, a step for carrying out the invalidation processing described below is carried out (step S110).

Then, a step for disconnecting the connection between the terminal device 10 and the ticket gate device 1 is carried out (step S109). More specifically, the detection unit 7*a* judges whether all of the human sensors 4*a* to 4*c* in the ticket gate device 1 are ON or not. When all of the human sensors 4*a* to 4*c* are OFF, the detection unit 7*a* judges that the passenger 30 has passed the ticket gate device 1, and outputs a disconnection signal for disconnecting the communication connection with the terminal device 10 to the radio communication unit 5. Then, when the disconnection signal is transmitted from the detection unit 7*a*, the radio communication unit 5 disconnects the communication connection with the terminal device 10.

Finally, a step for changing the displayed content of the display unit 6*a* (6*b*) to "passing permitted" is carried out.

Note that, in this embodiment, a step for displaying a message indicating that the data from the terminal device 10 is invalid such as "invalid", for example at the display unit 6*b* is carried out (step S201) at the invalidation processing step (S110) described above as shown in FIG. 5. More specifically, when it is judged that the data is invalid at the judgement unit 7*b*, the passing refusal signal for not passing the passenger 30 in the ticket gate device 1 is outputted from the judgement unit 7*b* to the display unit 6*b*. Then, when the passing refusal signal is entered from the judgement unit 7*b*, the display unit 6*b* displays a message indicating that the data from the terminal device 10 is invalid (such as "invalid", for example).

Next, a step for closing the gate at the gate unit 3 is carried out (step S202). More specifically, when the passing refusal signal is entered from the judgement unit 7*b*, the gate unit 3 closes the gate by using a servo motor (not shown) in the gate unit 3. Thereafter, a step for displaying "do not enter" at the display unit 6*a* and "passing disapproved" at the display unit 6*b* is carried out (step S203). More specifically, when the passing refusal signal is entered from the judgement unit 7*b*,the display unit 6*a* displays a message for not passing the subsequent passenger (such as "do not enter", for example) and the display unit 6*b* displays a message for not passing the passenger 30 in the ticket gate device 1 (such as "passing disapproved", for example).

Then, a step for judging whether the passenger 30 exists in the ticket gate device 1 or not is carried out at the judgement unit 7*b* (step S204). More specifically, when the detection signals indicating that all of the human sensors 4*a* to 4*c* in the ticket gate device 1 become OFF are outputted from the detection unit 7*a* to the judgement unit 7*b*, the judgement unit 7*b* judges that no passenger exists in the ticket gate device 1.

Then, the judgement unit 7*b* outputs the disconnection signal for disconnecting the communication connection with the terminal device 10 to the radio communication unit 5. When the disconnection signal is received, the radio communication unit 5 disconnects the communication connection with the terminal device 10 (step S205). In this way, if the data is invalid as a result of judging the validity of the data at the judgement unit 7*b*, it is possible to block the passage of the passenger 30 in the ticket gate device 1.

On the other hand, when any one of the human sensors 4*a* to 4*c* in the ticket gate device 1 becomes ON and the detection signal indicating turning ON of that human sensor is transmitted to the judgement unit 7*b*, the judgement unit 7*b* judges that the passenger 30 exists in the ticket gate device 1. Then, the judgement unit 7*b* which judges that the passenger 30 exists in the ticket gate device 1 commands the display unit 6*b* to continue to display a message for not passing the passenger 30 in the ticket gate device 1 (such as "passing disapproved", for example).

Finally, a step for switching the display of the display unit 6*a* (6*b*) is carried out (step S206). More specifically, when the disconnect signal is transmitted from the judgement unit 7*b*, the display unit 6*a* (6*b*) switches a message "passing disapproved" displayed on the display unit 6*a* and a message "do not enter" displayed on the display unit 6*b* to a message indicating the permission of the passing by the passenger (such as "passing permitted", for example).

Figure 6:
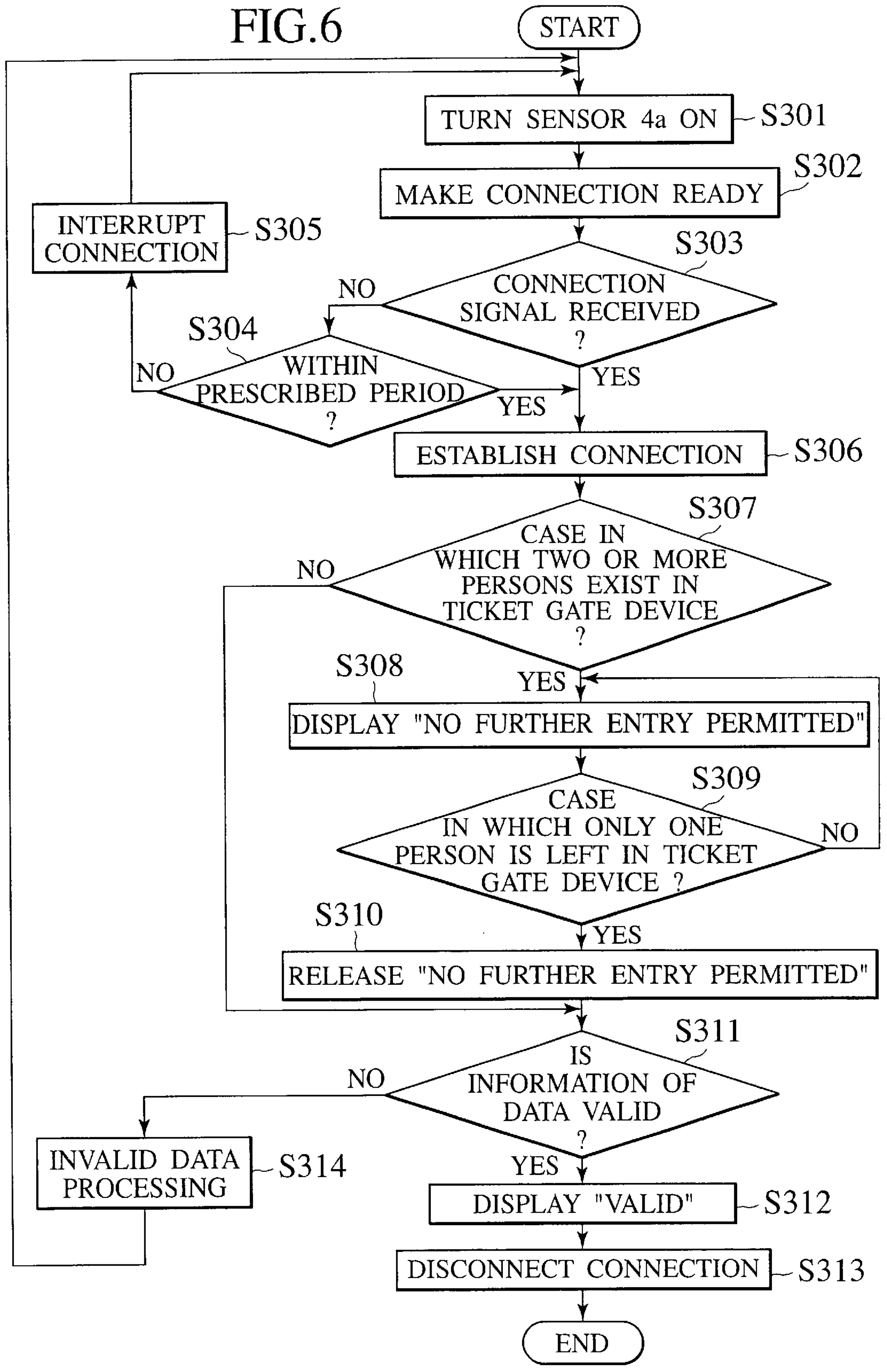
FIG. 6 is a flow chart for an operation of the gate entry system according to one embodiment of the present invention when more than one passengers have entered into a ticket gate device.

(2) The operation in the case where two or more passengers 30 exist in the ticket gate device 1:

When two or more passengers 30 have entered into the ticket gate device 1, there can be cases where the data of the subsequently entered passengers 30 following the passenger 30 who entered into the ticket gate device 1 first is received and processed. For this reason, the following procedure is designed to carry out the data processing appropriately even when two or more passengers 30 have entered into the ticket gate device 1. FIG. 6 shows the processing procedure of this operation.

As shown in FIG. 6, a step for turning the human sensor 4*a* ON as the passenger 30 enters into the ticket gate device 1 is carried out first (step S301), and then a step for making the radio communication unit 5 in the ticket gate device 1 in the connection ready state is carried out (step S302). More specifically, when the passenger 30 passes the human sensor 4*a* near the entrance of the ticket gate device 1, the human sensor 4*a* is turned ON. Then, the human sensor 4*a* is turned ON and the detection signal indicating turning ON of that human sensor is outputted to the detection unit 7*a* of the control unit 7.

Then, when the detection signal indicating that the human sensor4*a* is turned ON entered, the detection unit 7*a* outputs the reception signal for receiving the data from the terminal device 10 to the radio communication unit 5. Then, when the reception signal is received from the detection unit 7*a*, the radio communication unit 5 transmits a connection signal for carrying out the data exchange with the terminal device 10 (connection ready). Here, a message indicating the start of the ticket checking processing is outputted to the display unit 6*b* (which displays "processing" or an indicator for a prescribed time).

Next, the terminal device 10 receives the connection signal from the ticket gate device 1 (step S303), and a step for establishing the communication connection between the ticket gate device 1 and the terminal device 10 is carried out (step S306). When this communication connection with the terminal device 10 is established, the radio communication unit 5 of the ticket gate device 1 receives the data from the terminal device 10.

On the other hand, when the terminal device 10 does not receive the connection signal from the ticket gate device 1 within a prescribed waiting period, the communication connection is not established between the ticket gate device 1 and the terminal device 10 (steps S304 and S305).

More specifically, if the time-up function (not shown) in the terminal device 10 does not receive the connection signal from the ticket gate device 1 within a prescribed waiting period, the connection with the ticket gate device 1 is automatically interrupted. On the other hand, when the terminal device 10 received the connection signal within the prescribed waiting period, the connection is established.

Next, a step for judging whether two or more persons have entered into the ticket gate device 1 (checking and collecting machine, for example) or not is carried out by the detection unit 7*a* (step S307). More specifically, when all of the human sensors 4*a* and 4*b* are turned ON, an ON signal indicating that both of the human sensors 4*a* and 4*b* are turned ON is outputted to the detection unit 7*a*. Then, when the ON signal is entered, the detection unit 7*a* judges that two or more passengers 30 have entered because both of the human sensors 4*a* and 4*b* are turned ON.

Next, a step for displaying "no further entry permitted" at the display unit 6*a* (6*b*) is carried out. More specifically, when the ON signal indicating that both of the human sensors 4*a* and 4*b* are turned ON is entered, the detection unit 7*a* outputs the subsequent entry refusal command signal for blocking the entry of the subsequent passenger 30 into the ticket gate device 1 (making the state of having only one passenger 30 in the ticket gate device 1) to the display unit 6*a* (6*b*). Then, when the subsequent entry refusal command signal is received, the display unit 6*a* (6*b*) displays a message for refusing the entry of the subsequent passenger 30 (such as "no further entry permitted", for example).

Next, a step for judging whether there is only one passenger 30 in the ticket gate device 1 or not is carried out at the detection unit 7*a* (step S309). Then, when there is only one passenger 30 in the ticket gate device 1, a step for releasing "no further entry permitted" displayed at the display unit 6*a* (6*b*) is carried out (step S310). On the other hand, when there are more than one passengers 30 in the ticket gate device 1, the display of "no further entry permitted" at the display unit 6*a* (6*b*) is maintained.

More specifically, when it is detected that any one of the human sensors 4*a* and 4*b* is turned ON, the detection unit 7*a* judges that there is only one passenger 30 in the ticket gate device 1, and outputs a subsequent entry refusal release command signal for releasing the display for refusing the entry of the passenger 30 to the display unit 6*a* (6*b*). Then, when the subsequent entry refusal release command signal is entered, the display unit 6*a* (6*b*) releases the display for refusing the subsequent entry.

Then, a step for judging whether the data is valid or not is carried out (step S311). More specifically, after the communication connection is established between the ticket gate device 1 and the terminal device 10, the radio communication unit 5 of the ticket gate device 1 receives the data from the terminal device 10, and outputs that data to the judgement unit 7*b*. When that data is entered, the judgement unit 7*b* judges the validity of the data, such as the date of the ticket, the names of the stations to get on and off, the valid period of the ticket, etc.

Next, a step for displaying "valid" at the display unit 6*b* is carried out (step S312). More specifically, when it is judged that the data is valid as a result of judging the validity of the data at the judgement unit 7*b*, the judgement unit 7*b* outputs the passing signal for passing the passenger 30 in the ticket gate device 1 to the display unit 6*b*. Then, when the passing signal is received from the judgement unit 7*b*, the display unit 6*b* displays a message indicating the validness such as "valid", for example.

Also, when the processing of the data is still in progress, the judgement unit 7*b* outputs the processing in progress signal indicating that the processing is still in progress to the display unit 6*a* (6*b*). Then, when the processing in progress signal is received from the judgement unit 7*b*,the display unit 6*a* (6*b*) displays a message for refusing the entry of the subsequent passenger 30 (such as "no further entry permitted", for example). Also, the display unit 6*b* displays a message indicating that the processing is still in progress (such as "processing", for example).

On the other hand, when it is judged that the data is invalid as a result of judging the validity of the data at the judgement unit 7*b*, a step for carrying out the invalidation processing is carried out (step S314). This step S314 for carrying out the invalidation processing is similar to the invalidation processing shown in FIG. 5.

Finally, a step for disconnecting the connection between the terminal device 10 and the ticket gate device 1 is carried out (step S313). More specifically, the detection unit 7*a* judges whether all of the human sensor 4*a* to 4*c* in the ticket gate device 1 are ON or not. When the detection signal indicating that all of the human sensors 4*a* to 4*c* are OFF is received, the detection unit 7*a* judges that the passenger 30 has passed the ticket gate device 1, and outputs a disconnection signal for disconnecting the communication connection with the terminal device 10 to the radio communication unit 5. Then, when the disconnection signal is transmitted from the detection unit 7*a*, the radio communication unit 5 disconnects the communication connection with the terminal device 10.

In this way, when more than one passengers 30 have entered into the ticket gate device 1, it is possible to give a warning for eliminating the subsequent passengers 30 so that it becomes possible to eliminate the subsequent passengers 30 quickly and it becomes possible to process the ticket information in the order starting from the passenger 30 who entered first.

Figure 7:
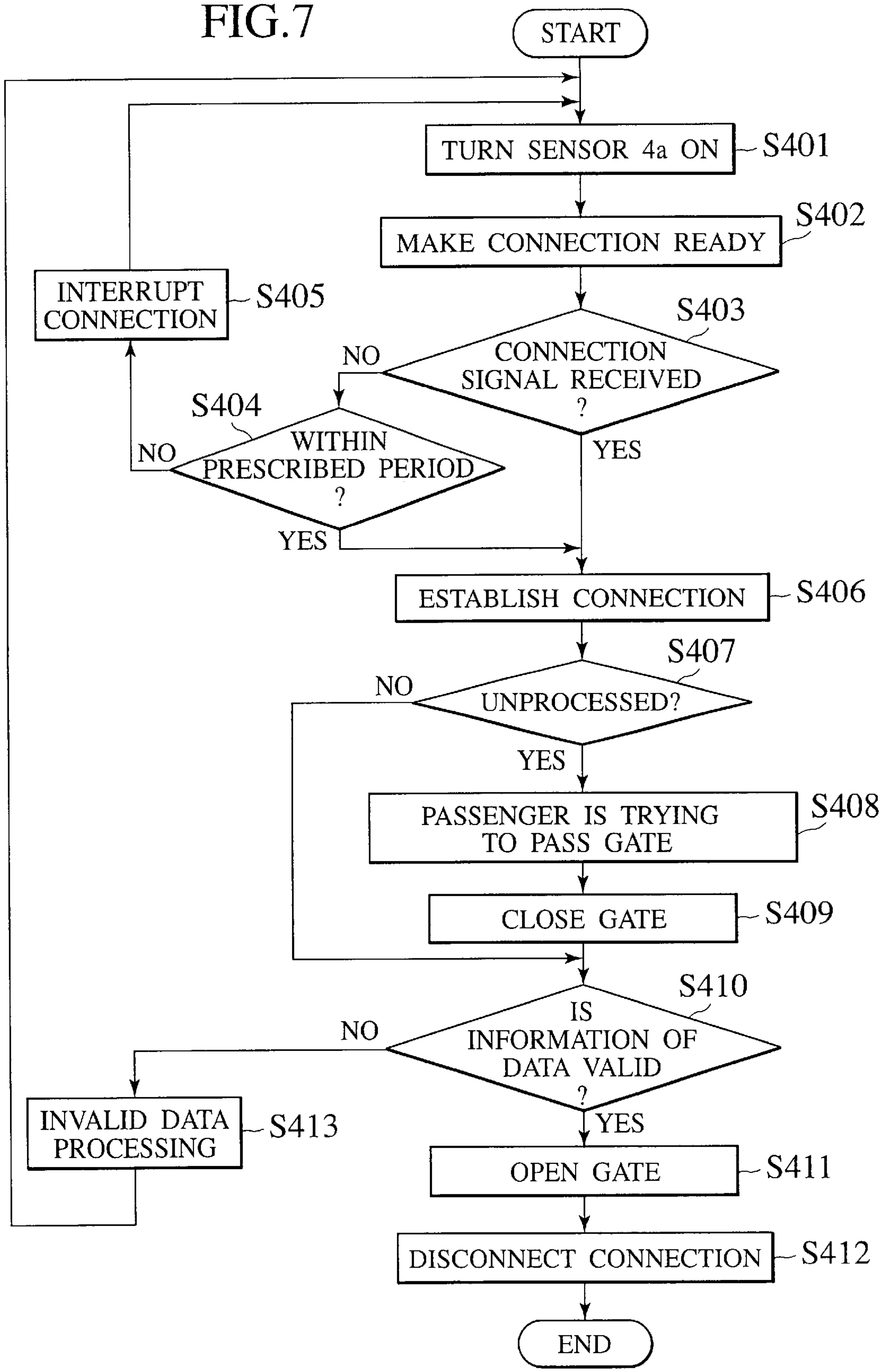
FIG. 7 is a flow chart for an operation of the gate entry system according to one embodiment of the present invention when a passenger tries to pass a ticket gate device despite of the fact that a data processing of the passenger at the ticket gate device is not completed.

(3) The operation in the case where the passenger tries to pass the ticket gate device 1 quickly:

There can be cases where the passenger tries to pass the ticket gate device 1 despite of the fact that the processing of the data carried out by the ticket gate device 1 is unfinished. If the passenger 30 tries to pass the ticket gate device 1 despite of the fact that the data of the passenger 30 is unprocessed, the following operation is carried out. FIG. 7 shows the processing procedure of this operation.

As shown in FIG. 7, a step for turning the human sensor 4*a* ON as the passenger 30 enters into the ticket gate device 1 is carried out (step S401), and then a step for making the radio communication unit 5 in the ticket gate device 1 in the connection ready state is carried out (step S402). More specifically, when the passenger 30 passes the human sensor 4*a* near the entrance of the ticket gate device 1, the human sensor 4*a* is turned ON. Then, when the human sensor 4*a* is turned ON, the detection signal indicating turning ON of that human sensor is outputted to the detection unit 7*a* of the control unit 7.

Then, when the detection signal indicating that the human sensor4*a* is turned ON is received, the detection unit 7*a* outputs the reception signal for receiving the data from the terminal device 10 to the radio communication unit 5. Then, when the reception signal is transmitted from the detection unit 7*a*, the radio communication unit 5 transmits a connection signal for carrying out the data exchange with the terminal device 10 (connection ready). Here, a message indicating the start of the ticket checking processing is outputted to the display unit 6*b* (which displays "processing" or an indicator for a prescribed time).

Next, the terminal device 10 receives the connection signal from the ticket gate device 1 (step S403), and a step for establishing the communication connection between the ticket gate device 1 and the terminal device 10 is carried out (step S406). When this communication connection with the terminal device 10 is established, the radio communication unit 5 of the ticket gate device 1 receives the data from the terminal device 10.

On the other hand, when the terminal device 10 does not receive the connection signal from the ticket gate device 1 within a prescribed waiting period, the communication connection is not established between the ticket gate device 1 and the terminal device 10 (steps S404 and S405).

More specifically, if the time-up function (not shown) in the terminal device 10 does not receive the connection signal from the ticket gate device 1 within a prescribed waiting period, the connection with the ticket gate device 1 is automatically interrupted. On the other hand, when the terminal device 10 received the connection signal within the prescribed waiting period, the connection is established.

Then, when the connection is established, a step for judging the validity of the data from the terminal device 10 is carried out at the judgement unit 7*b* (step S407). More specifically, after the communication connection is established between the ticket gate device 1 and the terminal device 10, the radio communication unit 5 of the ticket gate device 1 receives the data from the terminal device 10, and outputs that data to the judgement unit 7*b*.

Then, when the passenger 30 in the ticket gate device 1 tries to pass despite of the fact that the processing of the data carried out by the judgement unit 7*b* is unfinished, a step for closing the gate is carried out at the gate unit 3 (steps S408 and S409). More specifically, when the judgement unit 7*b* is in the state of processing the data, the passing refusal command signal for blocking the passing of the passenger 30 in the ticket gate device 1 is outputted to the gate unit 3.

Then, when the passing refusal command signal is received, the gate unit 3 closes the gate so as to block the passing passenger 30 if the passenger 30 in the ticket gate device 1 passes the human sensor 4*c*. Also, the judgement unit 7*b* outputs the passing refusal command signal to the display unit 6*b* as well. Then, when the passing refusal command signal is received, the display unit 6*b* displays a warning message for warning the passenger 30 in the ticket gate device 1 (such as "do not pass the gate because the data is unprocessed", for example).

Also, when the data is valid, a step for opening the gate in the ticket gate device 1 is carried out (steps S410 and S411). More specifically, when it is judged that the data is valid, the judgement unit 7*b* outputs the passing signal for passing the passenger 30 in the ticket gate device 1 to the display unit 6*b*. Then, when the passing signal is received from the judgement unit 7*b*, the gate unit 3 opens the gate.

On the other hand, when it is judged that the data is invalid as a result of judging the validity of the data at the judgement unit 7*b*, a step for carrying out the invalidation processing is carried out (step S413). This step S413 for carrying out the invalidation processing is similar to the invalidation processing shown in FIG. 5.

Finally, a step for disconnecting the connection between the terminal device 10 and the ticket gate device 1 is carried out (step S412). More specifically, the detection unit 7*a* judges whether all of the human sensor 4*a* to 4*c* in the ticket gate device 1 are ON or not. When the detection signal indicating that all of the human sensors 4*a* to 4*c* are OFF is received, the detection unit 7*a* judges that the passenger 30 has passed the ticket gate device 1, and outputs a disconnection signal for disconnecting the communication connection with the terminal device 10 to the radio communication unit 5. Then, when the disconnection signal is entered from the detection unit 7*a*, the radio communication unit 5 disconnects the communication connection with the terminal device 10.

In this way, when the judgement unit 7*b* is not processed the data yet, it is possible to block the passing passenger 30 in the ticket gate device 1.

(Effects of the Gate Entry System of This Embodiment)

According to the gate entry system of this embodiment as described above, the data communication connection can be established between the terminal device 10 carried by the passenger and the ticket gate device 1 (the automatic checking and collecting machine, for example) in cooperation with the human sensor 4*a*, so that the automatic checking and collecting machine can have the communication connection with only the necessary correspondent.

Also, a plurality of human sensors 4*a* to 4*c* are provided at the ticket gate device 1 so that it is possible to comprehend the state of the passengers in the ticket gate device 1 easily. Also, when the communication connection cannot be established with the Bluetooth of the passenger despite of the fact that the communication connection is requested from the automatic checking and collecting machine (as in the case where the passenger quits to pass the ticket gate device 1 and goes out of the ticket gate device 1, for example), the human sensors 4*a* to 4*c* can sense that state and interrupt the communication connection (time-up function).

Also, the data transmitted from the terminal device 10 carried by the passenger can be replaced by the information regarding the passing permission for regulating the passage of the passenger (such as the ticket for the railway, the ticket for the movie, etc., for example), so that there is no need for the passenger passing the ticket gate device 1 to purchase the ticket at a specific place.

Also, the detectable range A2 of the human sensor 4*a* provided at a front side along the passing direction of the passageway does not belong to the communication possible range A1 of the radio communication unit 5, so that it is possible to detect the subsequent passenger located outside the communication possible range of the radio communication unit 5 by the human sensor 4*a* located near the entrance.

Also, when the passenger tries to pass the gate unit 3 (by moving rapidly through the gate, for example) before the data transmission/reception carried out between the terminal device 10 carried by the passenger and the radio communication unit 5 is completed, it is possible to close the gate by a command from the control unit 7 so that it is possible to prevent the passage of the passenger who has not been subjected to the proper data processing.

Also, when the connection between the terminal device 10 of the passenger and the radio communication unit 5 is already established, it is possible to display a message for permitting an entry of more passengers besides the passenger already in the communication possible range A1 of the radio communication unit 5 (such as "subsequent entry permitted", for example).

On the other hand, when the connection between the terminal device 10 of the passenger already in the communication possible range A1 of the radio communication unit 5 and the radio communication unit 5 is not established yet, it is possible to display a message for blocking the entry of the passenger following the passenger already in the communication possible range A1 of the radio communication unit 5 (such as "subsequent entry not permitted", for example). In this way, even when more than one passengers have entered into the communication possible range A1 of the radio communication unit 5, it is possible to eliminate the entry of the subsequent passenger so that it is possible to prevent a data processing trouble that can be occurred between a preceding passenger and a subsequent passenger.

Also, the state of progress of the processing of the data transmitted to the radio communication unit 5 by the passenger can be displayed at the display unit 6*a* (6*b*), the passenger can easily comprehend the state of progress of the processing of the own data.

Also, the passenger can enter into the ticket gate device 1 according to the guidance of the display unit 6*a* (6*b*) provided along the passing direction. Also, the subsequent passenger can easily comprehend the state of waiting period until the processing of the preceding passenger is finished, so that it is possible to prevent the data processing trouble that can be occurred between a preceding passenger and a subsequent passenger.

(First Modified Embodiment)

Figure 8A:
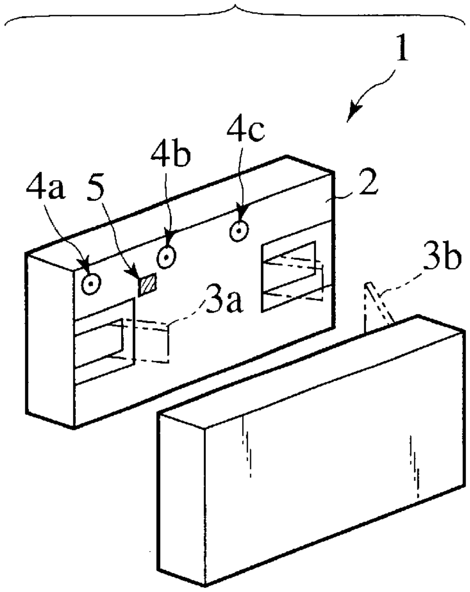
FIGS. 8A to 8D are diagrams showing perspective views of a ticket gate device of the gate entry system according to first to fourth modified embodiments of the present invention.

FIG. 8A shows the perspective view of the ticket gate device 1 according to the first modified embodiment. As shown in FIG. 8A, it is possible to provide the gate unit 3*a* near the entrance, in addition to the gate unit 3*b* near the exit. More specifically, when the first passenger 30 enters the ticket gate device 1, the gate unit 3*a* near the entrance is closed so as to block the entry of the subsequent passenger 30. Then, when the processing of the first passenger 30 in the ticket gate device 1 is finished and the first passenger 30 passes the ticket gate device 1, the gate unit 3*a* near the entrance is opened so as to permit the entry of the subsequent passenger 30.

According to the ticket gate device 1 of this first modified embodiment, it is possible to block the subsequent passenger 30 more definitely compared with the case of having only one gate unit 3.

(Second Modified Embodiment)

Figure 8B:
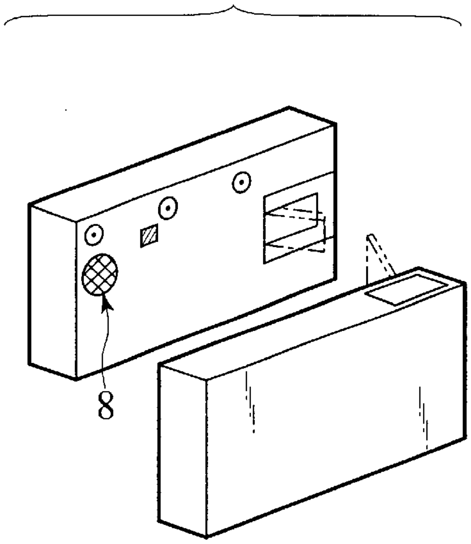

FIG. 8B shows the perspective view of the ticket gate device 1 according to the second modified embodiment. As shown in FIG. 8B, it is possible to provide a speech unit 8 to the ticket gate device 1.

The speech unit 8 of this modified embodiment calls for the attention by the speech to the terminal device 10 carried by the passenger 30, and can be provided in a form of a loudspeaker for generating sounds, for example. Note that the speech unit 8 can be provided near the entrance of the ticket gate device 1.

The operation of the ticket gate device 1 in this configuration can be as follows. First, the user sets an own ID code (such as name, number, symbol, etc.) by using the operation unit 11 of the terminal device 10. Then, when the data containing the own ID code is transmitted from the terminal device 10 to the ticket gate device 1, the radio communication unit 5 receives that data.

Then, the data received by the radio communication unit 5 of the ticket gate device 1 is temporarily stored in the judgement unit 7*b* of the control unit 7, and when the user of the terminal device 10 has not been processed properly (the user has tried to get out from the ticket gate device 1 despite of the fact that the user is still unprocessed, or more than two users have entered into the ticket gate device 1, for example), a warning signal containing the ID code is outputted from the judgement unit 7*b* to the speech unit 8 so as to call for the attention of the user (such as "Mr. so and so please get out of the ticket gate device 1" or "please get out of the ticket gate device 1" in the case where the ID code has not been entered into the judgement unit 7*b*, for example).

According to the ticket gate device 1 of this modified embodiment, it is possible to warn the passenger 30 directly by the speech from the speech unit 8, so that it is possible to call for the attention of the user quickly.

(Third Modified Embodiment)

Figure 8C:
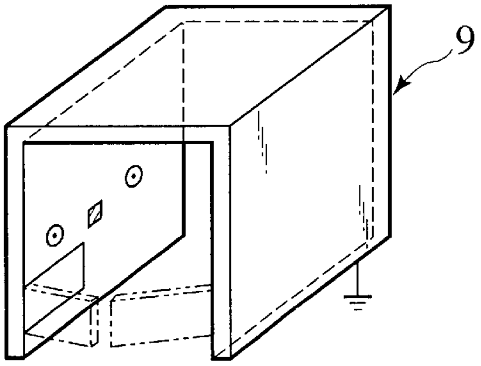

FIG. 8C shows the perspective view of the ticket gate device 1 according to the third modified embodiment. As shown in FIG. 8C, the ticket gate device 1 may be provided with a shielding 9.

The shielding 9 of this modified embodiment shields the external noises, and can be provided in a form of a grounded conductor plate, for example. When the external noises are entered, this shielding 9 can shield the external noises by letting them go through the grounding of the conductor plate.

In this way, even when the data is transmitted to one ticket gate device 1 among a plurality of ticket gate devices, the similar data for the other ticket gate device 1 will not be mixed so that the data transmitted by the passenger 30 can be processed properly at the ticket gate device 1.

(Fourth Modified Embodiment)

Figure 8D:
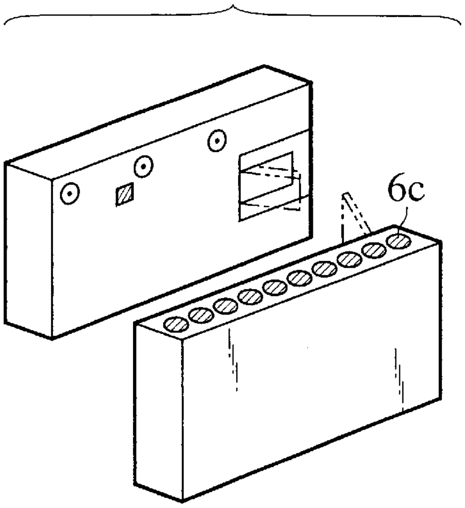

FIG. 8D shows the ticket gate device 1 of the fourth modified embodiment, which has display unit 6*c* arranged along the passing direction of the passenger 30 in the passageway, for guiding the passing by the passenger 30 according to the state of progress of the processing.

The display unit 6*c* shown in FIG. 8D is arranged along the passing direction of the passenger 30 in the passageway, for guiding the passing of the passenger 30 according to the state of progress of the processing, and can be provided in forms of LEDs, for example. More specifically, when a state signal indicating that the data processing is still in progress is entered from the judgement unit 7*b*, the display unit 6*c* flashes a half of the LEDs, for example.

Also, when a state signal indicating that the data processing is completed is entered from the judgement unit 7*b*, the display unit 6*c* flashes all the LEDs. In this way, the passenger 30 passing the ticket gate device 1 can objectively comprehend when it is possible to pass.

The operation of the ticket gate device 1 according to this modified embodiment can be as follows.

First, a step for turning the human sensor 4*a* ON is carried out. More specifically, when the passenger 30 passes the human sensor 4*a* near the entrance of the ticket gate device 1, the human sensor 4*a* is turned ON. Then, when the human sensor 4*a* is turned ON, the detection signal indicating that the human sensor 4*a* is turned ON is outputted to the detection unit 7*a* of the control unit 7.

Then, a step for setting the radio communication unit 5 of the ticket gate device 1 in the connection ready state is carried out. More specifically, when the detection signal indicating that the human sensor 4*a* is turned ON is entered, the detection unit 7*a* outputs the reception signal for receiving the data from the terminal device 10 to the radio communication unit 5. Then, when the reception signal is received from the detection unit 7*a*, the radio communication unit 5 transmits a connection signal for carrying out the data exchange to the terminal device 10.

Next, the terminal device 10 receives the connection signal from the ticket gate device 1, and a step for establishing the communication connection between the ticket gate device 1 and the terminal device 10 is carried out. On the other hand, when the terminal device 10 does not receive the connection signal from the ticket gate device 1 within a prescribed waiting period, the communication connection is not established between the ticket gate device 1 and the terminal device 10 (steps S104 and S105).

More specifically, if the time-up function (not shown) in the terminal device 10 does not receive the connection signal from the ticket gate device 1 within a prescribed waiting period, the connection with the ticket gate device 1 is automatically interrupted. On the other hand, when the terminal device 10 received the connection signal within the prescribed waiting period, the connection is established.

Next, a step for judging whether the data is valid or not is carried out. More specifically, after the communication connection is established between the ticket gate device 1 and the terminal device 10, the radio communication unit 5 of the ticket gate device 1 receives the data from the terminal device 10, and outputs that data to the judgement unit 7*b* in the control unit 7. When that data is received, the judgement unit 7*b* judges the validity of the data, such as the date of the ticket, the names of the stations to get on and off, the valid period of the ticket, etc.

Next, a step for displaying the state of progress of the data processing at the display unit 6*c* is carried out. The display unit 6*c* flashes a half of the LEDs, for example, when the state signal indicating that the data processing is still in progress from the judgement unit 7*b*.

Also, when the state signal indicating that the data processing is completed is received from the judgement unit 7*b*, the display unit 6*c* flashes all the LEDs.

Next, a step for displaying "valid" at the display unit 6*b* is carried out. More specifically, when it is judged that the data is valid as a result of judging the validity of the data at the judgement unit 7*b*, the judgement unit 7*b* outputs the passing signal for passing the passenger 30 in the ticket gate device 1 to the display unit 6*b*. Then, when the passing signal is entered from the judgement unit 7*b*, the display unit 6*b* displays a message indicating the validness such as "valid", for example.

Also, when the processing of the data is still in progress, the judgement unit 7*b* outputs the processing in progress signal indicating that the processing is still in progress to the display unit 6*a* (6*b*). Then, when the processing in progress signal is received from the judgement unit 7*b*, the display unit 6*a* (6*b*) displays a message for refusing the entry of the subsequent passenger 30 (such as "no further entry permitted", for example). Also, the display unit 6*b* displays a message indicating that the processing is still in progress (such as "processing", for example).

Figure 5:
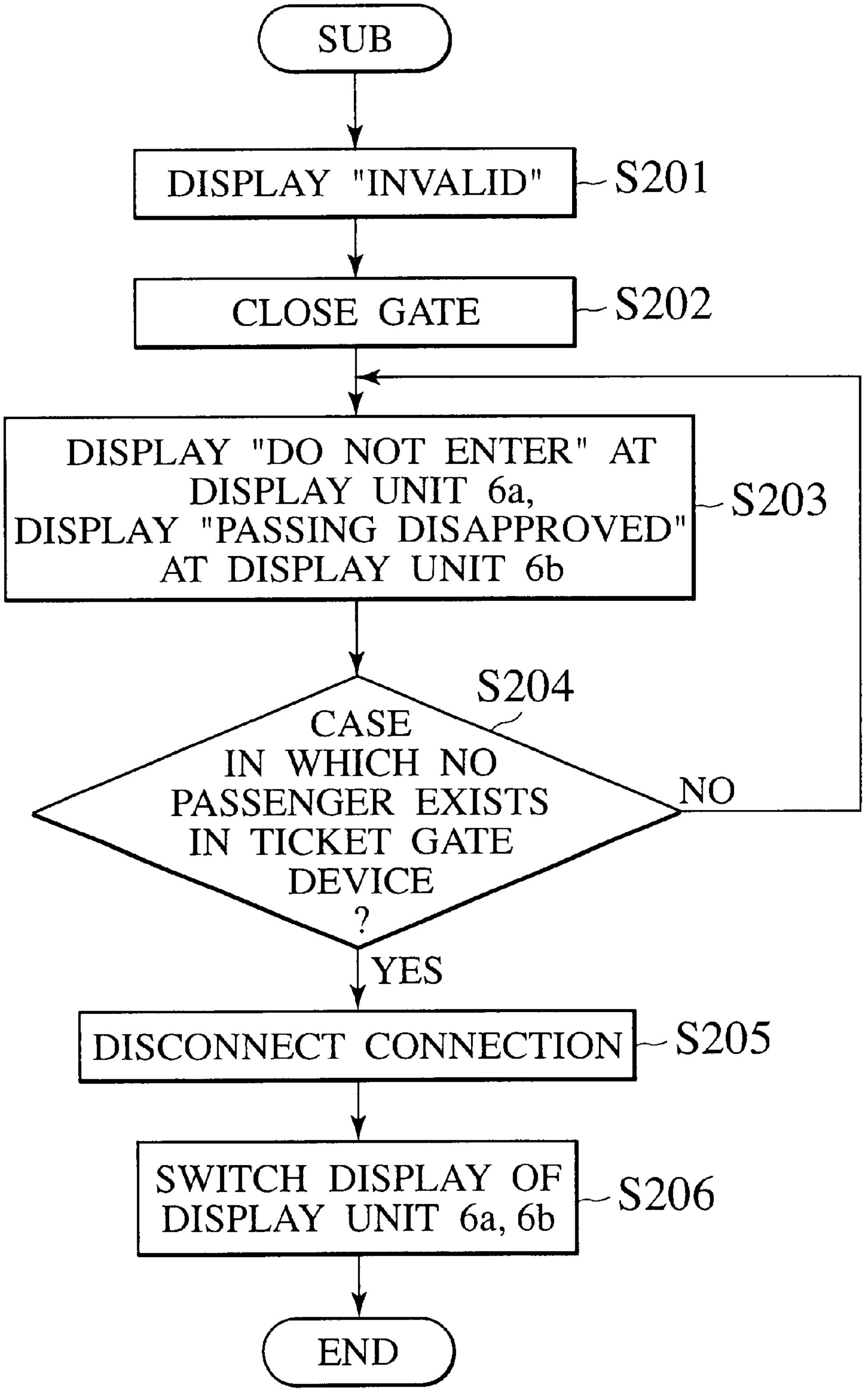
FIG. 5 is a flow chart for an invalidation processing to be carried out by a ticket gate device according to one embodiment of the present invention.

On the other hand, when it is judged that the data is invalid as a result of judging the validity of the data at the judgement unit 7*b*, a step for carrying out the invalidation processing is carried out. This invalidation processing is carried out as shown in FIG. 5.

Finally, a step for disconnecting the connection between the terminal device 10 and the ticket gate device 1 is carried out. More specifically, the detection unit 7*a* judges whether all of the human sensor 4*a* to 4*c* in the ticket gate device 1 are ON or not. When all of the human sensors 4*a* to 4*c* are OFF, the detection unit 7*a* judges that the passenger 30 has passed the ticket gate device 1, and outputs a disconnection signal for disconnecting the communication connection with the terminal device 10 to the radio communication unit 5. Then, when the disconnection signal is received from the detection unit 7*a*, the radio communication unit 5 disconnects the communication connection with the terminal device 10.

(Fifth Modified Embodiment)

Figure 9:
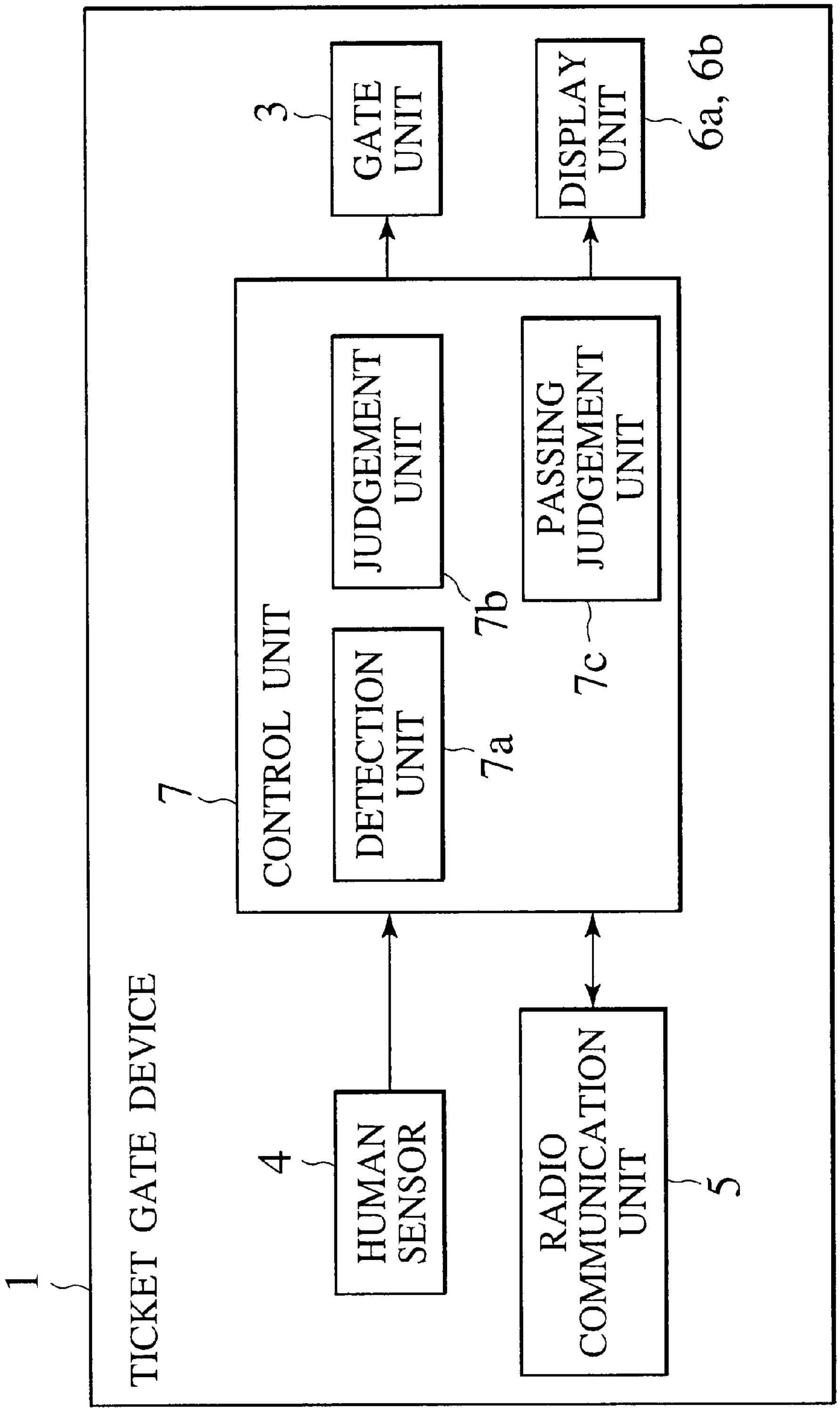
FIG. 9 is a block diagram showing an internal configuration of a ticket gate device of the gate entry system according to a fifth modified embodiment of the present invention.

FIG. 9 shows the internal configuration of the ticket gate device 1 of the fifth modified embodiment. As shown in FIG. 9, it is possible to provide a passing judgement unit 7*c* in the control unit 7.

The passing judgement unit 7*c* of this modified embodiment judges whether the properly data processed passenger 30 passes or not. More specifically, the passing judgement unit 7*b* temporarily stores the data received by the radio communication unit 5 first (including the ID code, which will be referred to as the first ID data), and when the passenger 30 passes the ticket gate device 1, the data (including the ID code, which will be referred to as the second ID data) is received by the radio communication unit 5 of the ticket gate device 1 again and the second ID data is also temporarily stored in the passing judgement unit 7*b*.

Then, the passing judgement unit 7*c* compares the internally stored first ID data and second ID data, and if they coincide, the passing judgement unit 7*c* outputs the passing signal for passing the passenger 30 in the ticket gate device 1 to the gate unit 3. Similarly, if the first ID data and the second ID data do not coincide, the passing judgement unit 7*c* outputs the passing refusal signal for not passing the passenger 30 in the ticket gate device 1 to the gate unit 3.

In this way, even when the data of the subsequent passenger is erroneously received at the radio communication unit 5 and processed before the data of the preceding passenger 30, it is possible to limit the passage of the preceding passenger 30 for which the data processing has not been carried out.

Figure 10:
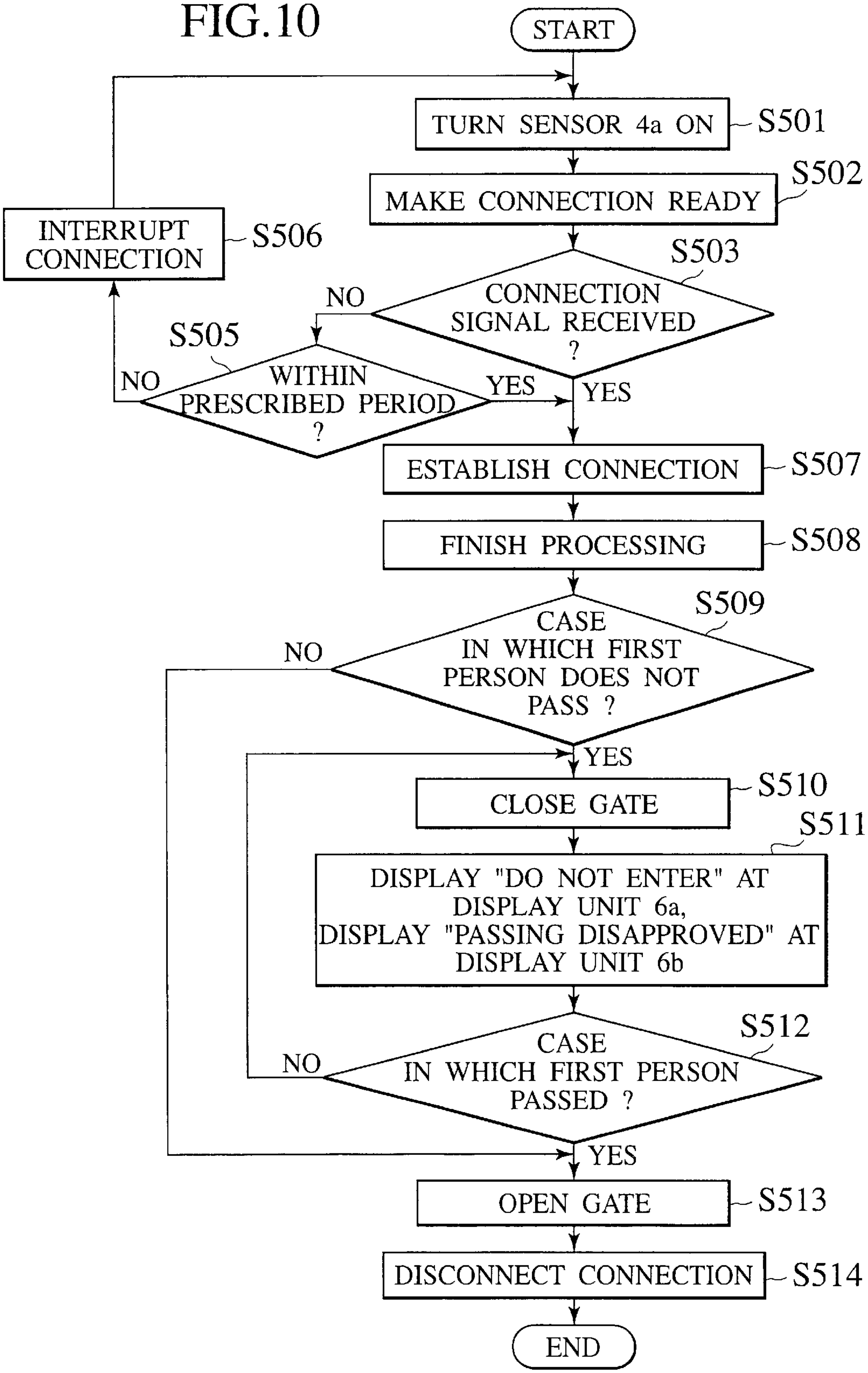
FIG. 10 is a flow chart for an operation of the fate system according to a fifth modified embodiment of the present invention when a proper passenger does not pass a ticket gate device.

The operation of the ticket gate device 1 according to this modified embodiment can be as follows. FIG. 10 shows the processing procedure of the ticket gate device 1 in this modified embodiment.

As shown in FIG. 10, a step for turning the human sensor 4*a* ON as the passenger 30 enters into the ticket gate device 1 is carried out first (step S501), and then a step for making the radio communication unit 5 in the ticket gate device 1 in the connection ready state is carried out (step S502). More specifically, when the passenger 30 passes the human sensor 4*a* near the entrance of the ticket gate device 1, the human sensor 4*a* is turned ON. Then, when the human sensor 4*a* is turned ON, the detection signal indicating turning ON of that human sensor is outputted to the detection unit 7*a* of the control unit 7.

Then, when the detection signal indicating that the human sensor4*a* is turned ON entered, the detection unit 7*a* outputs the reception signal for receiving the data from the terminal device 10 to the radio communication unit 5. Then, when the reception signal is transmitted from the detection unit 7*a*, the radio communication unit 5 transmits a connection signal for carrying out the data exchange with the terminal device 10 (connection ready). Here, a message indicating the start of the ticket checking processing is outputted to the display unit 6*b* (which displays "processing" or an indicator for a prescribed time).

Next, the terminal device 10 receives the connection signal from the ticket gate device 1 (step S503), and a step for establishing the communication connection between the ticket gate device 1 and the terminal device 10 is carried out (step S507). When this communication connection with the terminal device 10 is established, the radio communication unit 5 of the ticket gate device 1 receives the data from the terminal device 10. In this case, the received data includes the ID code for identifying the passenger 30 of the terminal device 10.

On the other hand, when the terminal device 10 does not receive the connection signal from the ticket gate device 1 within a prescribed waiting period, the communication connection is not established between the ticket gate device 1 and the terminal device 10 (steps S505 and S506).

More specifically, if the time-up function (not shown) in the terminal device 10 does not receive the connection signal from the ticket gate device 1 within a prescribed waiting period, the connection with the ticket gate device 1 is automatically interrupted. On the other hand, when the terminal device 10 received the connection signal within the prescribed waiting period, the connection is established.

Next, the validity of the data from the terminal device 10 is judged at the judgement unit 7*b*, and if the content of that data is valid, a step for passing the passenger 30 in the ticket gate device 1 is carried out (step 509). More specifically, the radio communication unit 5 receives the data of the passenger 30 in the ticket gate device 1 and outputs the ID code in that data to the passing judgement unit 7*c*.

Then, the passing judgement unit 7*b* temporarily stores the data received by the radio communication unit 5 first (the first ID data). Also, when the passenger 30 passes the ticket gate device 1, the data (the second ID data) is received by the radio communication unit 5 of the ticket gate device 1 again and the second ID data is also temporarily stored in the passing judgement unit 7*b*.

Then, the passing judgement unit 7*c* compares the internally stored first ID data and second ID data, and if they coincide, the passing judgement unit 7*c* outputs the passing signal for passing the passenger 30 in the ticket gate device 1 to the gate unit 3. Similarly, if the first ID data and the second ID data do not coincide, the passing judgement unit 7*c* outputs the passing refusal signal for not passing the passenger 30 in the ticket gate device 1 to the gate unit 3 and the display unit 6*b*.

Then, when the ID data of the passenger 30 in the ticket gate device 1 do not coincide, the judgement unit 7*b* carries out a step for closing the gate of the ticket gate device 1 (step S510), and then carries out a step for displaying "do not enter" at the display unit 6*a* and "passing disapproved" at the display unit 6*b* (step S511).

More specifically, when the passing refusal signal is transmitted from the judgement unit 7*b*, the display unit 6*a* displays a message for not passing the subsequent passenger (such as "do not enter", for example), and the display unit 6*b* displays a message for not passing the passenger 30 in the ticket gate device 1 (such as "passing disapproved", for example).

Also, when the passenger 30 who has the second ID data passes the ticket gate 1, a step for opening the gate of the ticket gate device 1 is carried out (step S512). More specifically, when the second ID data is received at the radio communication unit 5, that second ID data is outputted to the passing judgement unit 7*c*. Then, when the second ID data is received, the passing judgement unit 7*c* judges that the it coincides with the first ID data received first, and outputs the passing signal for passing the passenger 30 in the ticket gate device 1 to the gate unit 3.

Also, the passing judgement unit 7*c* outputs a release command for releasing the warning display displayed at the display unit 6*b* to the display unit 6*b*. Then, when the passing command signal is received, the gate unit 3 opens the gate of the ticket gate device 1 (step S513). Also, when the release command is entered, the display unit 6*b* releases the warning display in order to pass the passenger 30 in the ticket gate device 1. On the other hand, when the passenger who has the first ID data does not pass the ticket gate device 1, a step for maintaining the warning display (such as "passing disapproved", for example) is carried out (step S511).

Finally, a step for disconnecting the connection between the terminal device 10 and the ticket gate device 1 is carried out (step S514). More specifically, the detection unit 7*a* judges whether all of the human sensor 4*a* to 4*c* in the ticket gate device 1 are ON or not. When the detection signal indicating that all of the human sensors 4*a* to 4*c* are OFF is received, the detection unit 7*a* judges that the passenger 30 has passed the ticket gate device 1, and outputs a disconnection signal for disconnecting the communication connection with the terminal device 10 to the radio communication unit 5. Then, when the disconnection signal is transmitted from the detection unit 7*a*, the radio communication unit 5 disconnects the communication connection with the terminal device 10.

As described, according to the present invention, it is possible to carry out the processing of the passengers properly at the automatic checking and collecting machine side, even when the radio technology (especially the Bluetooth) is applied to the automatic checking and collecting machine, for example.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A gate entry system for regulating passages of passengers who carry short range radio technology based portable terminal devices, comprising:

a wall unit configured to form a passageway that is extended along a passing direction of the passengers;

a gate unit provided at an exit side of the passageway, which is configured to be opened or closed to regulate the passages of the passengers;

human sensors configured to sense the passengers in the passageway;

a radio communication unit having a communication possible range within which terminal devices of a plurality of passengers in the passageway can be simultaneously located, and which is configured to detect a number of passengers entering into the passageway according to outputs of the human sensors, and to perform transmission/reception of data with respect to only one terminal device of one passenger in the passageway by establishing a connection only with the one terminal device; and a control unit configured to control an opening or closing of the gate unit according to the data received by the radio communication unit.

2. The gate entry system of claim 1, wherein the human sensors include a plurality of the human sensors arranged along the passing direction of the passengers.

3. The gate entry system of claim 1, wherein the radio communication unit receives the data that is information regarding a permission to pass the gate unit.

4. The gate entry system of claim 1, wherein at least one of the human sensors has a detectable range at a front side of a communication possible range of the radio communication unit along the passing direction of the passengers.

5. The gate entry system of claim 1, wherein the control unit closes the gate unit when at least one of the human sensors with a detectable range overlapping with a communication possible range of the radio communication unit detects a passenger before the transmission/reception of the data is finished.

6. The gate entry system of claim 1, wherein the control unit permits an entry of one subsequent passenger into a communication possible range of the radio communication unit when a connection with the terminal device of one passenger is already established.

7. The gate entry system of claim 1, further comprising:

a display unit configured to display a state of progress of a processing by the control unit.

8. The gate entry system of claim 7, wherein the display unit is arranged along the passing direction of the passengers and guides the passages of the passengers according to the state of progress of the processing.

9. A gate entry system for regulating passages of passengers who carry short range radio technology based portable terminal devices, comprising:

a wall unit configured to form a passageway that is extended along a passing direction of the passengers;

a gate unit provided at an exit side of the passageway, which is configured to be opened or closed to regulate the passages of the passengers;

means for sensing the passengers in the passageway;

means for detecting a number of passengers entering into the passageway according to outputs of the sensing means, and for performing transmission/reception of data with respect to only one terminal device of one passenger in the passageway by establishing a connection only with the one terminal device, said detecting means having a communication possible range within which terminal devices of a plurality of passengers in the passageway can be simultaneously located; and a control unit configured to control an opening or closing of the gate unit according to the data received by the radio communication unit.

10. The gate entry system of claim 9, wherein the sensing means includes a plurality of the human sensors arranged along the passing direction of the passengers.

11. The gate entry system of claim 9, wherein the detecting means receives the data that is information regarding a permission to pass the gate unit.

12. The gate entry system of claim 9, wherein the sensing means has a detectable range at a front side of a communication possible range of the radio communication unit along the passing direction of the passengers.

13. The gate entry system of claim 9, wherein the control unit closes the gate unit when the sensing means with a detectable range overlapping with a communication possible range of the detecting means detects a passenger before the transmission/reception of the data is finished.

14. The gate entry system of claim 9, wherein the control unit permits an entry of one subsequent passenger into a communication possible range of the detecting means when a connection with the terminal device of one passenger is already established.

15. The gate entry system of claim 9, further comprising:

means for displaying a state of progress of a processing by the control unit.

16. The gate entry system of claim 15, wherein the display means is arranged along the passing direction of the passengers and guides the passages of the passengers according to the state of progress of the processing.

* * * * *